(12) United States Patent
Murano et al.

(10) Patent No.: US 9,199,536 B2
(45) Date of Patent: Dec. 1, 2015

(54) ON-VEHICLE DISPLAY DEVICE AND ON-VEHICLE DISPLAY PROGRAM

(75) Inventors: Takahiko Murano, Shizuoka (JP); Kunihiko Toyofuku, Toyota (JP); Takeshi Tottori, Obu (JP); Makoto Inomata, Handa (JP); Masaaki Niwa, Nagoya (JP); Naoyuki Aoki, Kariya (JP)

(73) Assignees: TOYOTA JIDOSHA KABUSHIKI KAISHA, Toyota-shi (JP); DENSO CORPORATION, Kariya-shi (JP)

(*) Notice: Subject to any disclaimer, the term of this patent is extended or adjusted under 35 U.S.C. 154(b) by 858 days.

(21) Appl. No.: 12/675,457

(22) PCT Filed: Aug. 28, 2008

(86) PCT No.: PCT/JP2008/065402
§ 371 (c)(1),
(2), (4) Date: Apr. 13, 2010

(87) PCT Pub. No.: WO2009/028607
PCT Pub. Date: Mar. 5, 2009

(65) Prior Publication Data
US 2010/0208072 A1 Aug. 19, 2010

(30) Foreign Application Priority Data
Aug. 31, 2007 (JP) .............................. P2007-226560

(51) Int. Cl.
*H04N 7/18* (2006.01)
*B60K 35/00* (2006.01)
(52) U.S. Cl.
CPC ........... *B60K 35/00* (2013.01); *B60K 2350/106* (2013.01); *B60K 2350/906* (2013.01);
(Continued)

(58) Field of Classification Search
CPC .................. B60R 2300/00; B60R 2300/306; B60R 2300/302; B60R 2300/106
USPC .................................. 348/148; 345/619, 661
See application file for complete search history.

(56) References Cited

U.S. PATENT DOCUMENTS

2005/0073431 A1* 4/2005 Moisel et al. ................. 340/901
2006/0203091 A1* 9/2006 Eggers et al. ................. 348/148
(Continued)

FOREIGN PATENT DOCUMENTS

DE  103 46 511 A1  5/2005
JP  64 8447  1/1989
(Continued)

OTHER PUBLICATIONS

Office Action issued Jun. 16, 2011, in German Patent Application No. 11 2008 002 347.6 (with English-language translation).

*Primary Examiner* — William C Vaughn, Jr.
*Assistant Examiner* — Naod Belai
(74) *Attorney, Agent, or Firm* — Oblon, McClelland, Maier & Neustadt, L.L.P.

(57) ABSTRACT

An on-vehicle display device 1 displays a video around a vehicle and travel information of the vehicle on a single display unit 20. The on-vehicle display device 1 includes video display enable/disable input units 11, 12, 13, and 14 inputting display enable/disable of the video around the vehicle, display modification units 30 and 40 modifying the display size of each of a video display section and a travel information display section on the basis of the input video display enable/disable, and an input prediction unit 30 predicting input of display enable/disable of the video around the vehicle. Even when video display disable is input from a video display enable/disable input unit, if the input prediction unit 30 predicts input of video display enable, the display modification units 30 and 40 do not modify the display size of each of the video display section and the travel information display section.

10 Claims, 8 Drawing Sheets

(52) U.S. Cl.
CPC ..... *B60K2350/962* (2013.01); *B60R 2300/106* (2013.01); *B60R 2300/207* (2013.01); *B60R 2300/302* (2013.01); *B60R 2300/306* (2013.01); *B60R 2300/8053* (2013.01); *Y02T 10/84* (2013.01)

(56) References Cited

U.S. PATENT DOCUMENTS

2007/0171142 A1\* 7/2007 Ikarashi et al. ............... 345/4
2007/0273638 A1   11/2007 Nohno et al.

FOREIGN PATENT DOCUMENTS

| JP | 11 99879    | 4/1999 |
| JP | 2000 203309 | 7/2000 |
| JP | 2003 255342 | 9/2003 |
| JP | 2005 67405  | 3/2005 |
| JP | 2005 112347 | 4/2005 |
| JP | 2005 239042 | 9/2005 |
| JP | 2007 519984 | 7/2007 |
| JP | 2008 158497 | 7/2008 |

\* cited by examiner

PLEASE USE AT NIGHTTIME

PLEASE TURN ON HEADLIGHTS (c)

NOT DISPLAYED DURING REVERSING

NOT DISPLAYED DURING REVERSING (c)

ON-VEHICLE DISPLAY DEVICE AND ON-VEHICLE DISPLAY PROGRAM

TECHNICAL FIELD

The invention relates to an on-vehicle display device and an on-vehicle display program for displaying a video around a vehicle and travel information on the vehicle on a single display unit.

BACKGROUND ART

A navigation system is developed which has an on-vehicle night-vision function so as to assist a driver when he/she is hard to view with a naked eye at nighttime. In the navigation system, the front side of a vehicle is imaged by a near infrared ray camera and the near infrared video is displayed on a display. As the display, in addition to a display used in a navigation system or the like, a display for a meter whose entire surface is formed by a liquid crystal screen is also studied. When a display for a meter is used, a screen design for normal meter display which displays only vehicle information and a screen design for night view video display which displays a night view video are selectively used. For example, in an in-meter ambient monitor described in Patent Citation 1, vehicle ambient information (mirror information) on the left and right rear sides and the rear side captured by the respective cameras and normal vehicle information (meter information) are selectively displayed on a single monitor depending on the drive situations or road conditions, and in particular, when it is determined that vehicle ambient information is not required, a video display portion is made invisible and only meters are displayed.

[Patent Citation 1] Japanese Unexamined Patent Application Publication No. 11-99879
[Patent Citation 2] Japanese Unexamined Patent Application Publication No. 2003-255342
[Patent Citation 3] Japanese Unexamined Patent Application Publication No. 2005-67405
[Patent Citation 4] Japanese Unexamined Patent Application Publication No. 2005-112347

DISCLOSURE OF INVENTION

Technical Problem

When a night view video is displayed by using a display for a meter, there is a significant change of the screen design between the normal screen design for normal meter display and the screen design for night view video display in accordance with whether a night view video is displayed or not. In particular, with regard to display of a night view video, the display conditions are clearly stated in the technical guide defined by the Ministry of Land, Infrastructure, Transport and Tourism, and when it is not in the nighttime or when the headlamp is turned off, the night view video cannot be displayed. For this reason, even though the headlamp is temporarily turned on when the vehicle is stopped at a red light, the screen design for night view video display is temporarily switched to the screen design for meter display. Each time the screen design is switched, there is a significant change of the screen design, so the driver is very bothered and feels uncomfortable. Even though the driver wants to display a night view video by a switch operation, if the screen design for night view video display is switched to the screen design for meter display, he/she very feels uncomfortable.

Accordingly, it is an object of the invention to provide an on-vehicle display device and an on-vehicle display program which, when a video around a vehicle and travel information of the vehicle are displayed on a single display unit, causes a driver to feel less discomfort even though the video around the vehicle cannot be temporarily displayed.

Technical Solution

The invention provides an on-vehicle display device. The on-vehicle display device includes a display unit, an imaging unit imaging surroundings of a vehicle, a video display enable/disable input unit inputting display enable/disable of a video imaged by the imaging unit, a video display section displaying the video imaged by the imaging unit on the display unit, a travel information display section displaying travel information of the vehicle on the display unit, a display modification unit modifying the display size of each of the video display section and the travel information display section on the basis of input of video display enable/disable from the video display enable/disable input unit, and an input prediction unit predicting input of display enable/disable of the video imaged by the imaging unit. Even when video display disable is input from the video display enable/disable input unit, if the input prediction unit predicts input of video display enable, the display modification unit does not modify the display size of each of the video display section and the travel information display section or suppresses the degree of modification of the display size of each of the video display section and the travel information display section.

With this on-vehicle display device, the imaging unit images surrounds of the vehicle to acquire a video around the vehicle. With the on-vehicle display device, a single display unit is used, and the video display section for displaying the video around the vehicle and the travel information display section for displaying travel information of the vehicle are displayed on the display unit. With the on-vehicle display device, the video display enable/disable input unit inputs whether or not to display the video around the vehicle, and the video display section and the travel information display section are modified in the display size in accordance with enable/disable of video display and then displayed on the display unit. For example, when video display enable is input, the display size of the video display section is set to a predetermined size, and the display size of the travel information display section becomes smaller than the normal size. When video display disable is input, the video display section is made invisible, and the display size of the travel information display section is set to the normal size. In particular, even if video display disable is input from the video display enable/disable input unit, in the on-vehicle display device, when the input prediction unit predicts input of video display enable, the display size of each of the video display section and the travel information display section is not modified, or the degree of modification of the display size is suppressed. As described above, with the on-vehicle display device, when video display is temporarily disabled but can be predicted to be enabled, the display size of each of the video display section and the travel information display section is not modified or slightly modified, so there is no case where the display size of each of the video display section and the travel information display section is frequently modified. As a result, the driver is not bothered due to a significant change of the screen design, and does not feel uncomfortable.

In the on-vehicle display device of the invention, the input prediction unit may predict that video display enable will be input for a predetermined time after video display disable is input from the video display enable/disable input unit. When the display conditions of the video around the vehicle are not satisfied temporarily (for example, when a headlamp is temporarily turned on under the display conditions of a night view video), the display conditions are satisfied in short time, so it can be predicted that video display enable will be input in a predetermined time.

In the on-vehicle display device of the invention, when input of video display enable/disable cannot be predicted, the input prediction unit may predict that video display enable will be input. When input of video display enable/disable cannot be predicted, it is assumed that video display will be enabled, the display size of each of the video display section and the travel information display section is not modified as much as possible.

The invention also provides an on-vehicle display device. The on-vehicle display device includes a display unit, an imaging unit imaging surroundings of a vehicle, a video display enable/disable input unit inputting display enable/disable of a video imaged by the imaging unit, a video display section displaying the video imaged by the imaging unit on the display unit, a travel information display section displaying travel information of the vehicle on the display unit, and a display modification unit modifying the display size of each of the video display section and the travel information display section on the basis of input of video display enable/disable from the video display enable/disable input unit. The video display enable/disable input unit has a driver enable/disable input unit allowing a driver of the vehicle to input display enable/disable of the video imaged by the imaging unit, and a vehicle state enable/disable unit inputting display enable/disable of the video imaged by the imaging unit on the basis of the state of the vehicle. Even though video display disable is input from the vehicle state enable/disable unit when video display enable is input from the driver enable/disable input unit, the display modification unit does not modify the display size of each of the video display section and the travel information display section or suppresses the degree of modification of the display size of each of the video display section and the travel information display section.

With this on-vehicle display device, the imaging unit images surroundings of the vehicle to acquire a video around the vehicle. With the on-vehicle display device, a single display unit is used, and the video display section for displaying the video around the vehicle and the travel information display section for displaying travel information of the vehicle are displayed on the display unit. With the on-vehicle display device, the driver of the vehicle inputs whether to display the video around the vehicle or not by the driver enable/disable input unit of the video display enable/disable input unit, and the vehicle state enable/disable input unit inputs whether to display the video around the vehicle or not on the basis of the state of the vehicle (the state of the vehicle includes the state of the vehicle itself and the states around the vehicle), and the display modification unit modifies the display size of each of the video display section and the travel information display section in accordance with video display enable/disable. In particular, with the on-vehicle display device, when video display enable is input from the driver enable/disable input unit, even if video display disable is input from the vehicle state enable/disable input unit, the display size of each of the video display section and the travel information display section is not modified or the degree of modification of the display size is suppressed. As described above, with the on-vehicle display device, when the driver wants to display the video around the vehicle, and video display is temporarily disabled due to the state of the vehicle but can be predicted to be enabled, the display size of each of the video display section and the travel information display section is not modified or slightly modified, so the driver is not bothered and does not feel uncomfortable, in the same manner as described above.

In the on-vehicle display device of the invention, when video display enable is input from the driver enable/disable input unit and video display disable is input from the vehicle state enable/disable input unit, a predetermined image other than the video imaged by the imaging unit may be displayed on the video display section. When video display disable is input from the vehicle state enable/disable input unit, the video around the vehicle cannot be displayed, so a different image, such as a black image, is displayed on the video display section whose size is not modified or slightly modified.

The invention also provides an on-vehicle display program for displaying, on a display unit mounted on a vehicle, a video around the vehicle imaged by an imaging unit and travel information of the vehicle. The on-vehicle display program causes a computer to implement a display modification function to modify the display size of each of a video display section for displaying the video imaged by the imaging unit on the display unit and a travel information display section for displaying travel information of the vehicle on the display unit on the basis of video display enable/disable input from a video display enable/disable input unit for inputting display enable/disable of the video imaged by the imaging unit, and an input prediction function to predict input of display enable/disable of the video imaged by the imaging unit. When the input prediction function predicts input of video display enable even if video display disable is input from the video display enable/disable input unit, the display modification function does not modify the display size of each of the video display section and the travel information display section or suppresses the degree of modification of the display size of each of the video display section and the travel information display section.

The invention also provides an on-vehicle display program for displaying, on a display unit mounted on a vehicle, a video around the vehicle imaged by an imaging unit and travel information of the vehicle. The on-vehicle display program causes a computer to implement a display modification function to modify the display size of each of a video display section for displaying the video imaged by the imaging unit on the display unit and a travel information display section for displaying travel information of the vehicle on the display unit on the basis of video display enable/disable input from a video display enable/disable input unit for inputting display enable/disable of the video imaged by the imaging unit. When the video display enable/disable input unit has a driver enable/disable input unit allowing a driver of the vehicle to input display enable/disable of the video imaged by the imaging unit and a vehicle state enable/disable input unit inputting display enable/disable of the video imaged by the imaging unit on the basis of the state of the vehicle, when video display enable is input from the driver enable/disable input unit, even if video display disable is input from the vehicle state enable/disable input unit, the display modification function does not modify the display size of each of the video display section and the travel information display section or suppresses the degree of modification of the display size of each of the video display section and the travel information display section. With the on-vehicle display programs, the respective programs are executed by a computer, such that the same advantages of display control in the respective on-vehicle display devices can be obtained.

Advantageous Effects

According to the invention, when video display can be predicted to be enabled, the size of each of the video display section and the travel information display section is not modified or slightly modified, so the driver is not bothered due to a significant change of the screen design and feels less discomfort.

BRIEF DESCRIPTION OF DRAWINGS

FIG. 4 shows screen transition of a meter display in the case that a headlamp is turned of when a night view switch in the night view system of FIG. 1 is turned on, specifically, (a) shows a meter display mode when the night view switch is turned off, (b) shows advice display in a night view video display mode when the headlamp is turned off, and (c) shows the night view video display mode when the headlamp is turned on.

FIG. 7 shows screen transition of a meter display in the case that a headlamp is turned off when a night view switch in the night view system of FIG. 1 is turned on, specifically, (a) shows a night view video display mode, (b) shows advice display in the night view video display mode when the headlamp is turned off, and (c) shows the night view video display mode when the headlamp is turned on.

EXPLANATION OF REFERENCES

1: NIGHT VIEW SYSTEM
10: IGNITION SWITCH
11: NIGHT VIEW SWITCH
12: LAMP SWITCH
13: SHIFT POSITION SENSOR
14: ILLUMINANCE SENSOR
15: NEAR INFRARED RAY PROJECTOR
16: NEAR INFRARED RAY CAMERA
20: METER DISPLAY
30: NIGHT VIEW ECU
40: METER ECU

BEST MODE FOR CARRYING OUT THE INVENTION

Hereinafter, an embodiment of an on-vehicle display device and an on-vehicle display program according to the invention will be described with reference to the drawings.

In this embodiment, the on-vehicle display device according to the invention is applied to a night view system mounted on the vehicle. A night view system according to this embodiment displays a near infrared ray image imaged by a near infrared ray camera on a display for a meter so as to assist a driver when he/she is hard to view with a naked eye at nighttime drive or the like.

Figure 1:
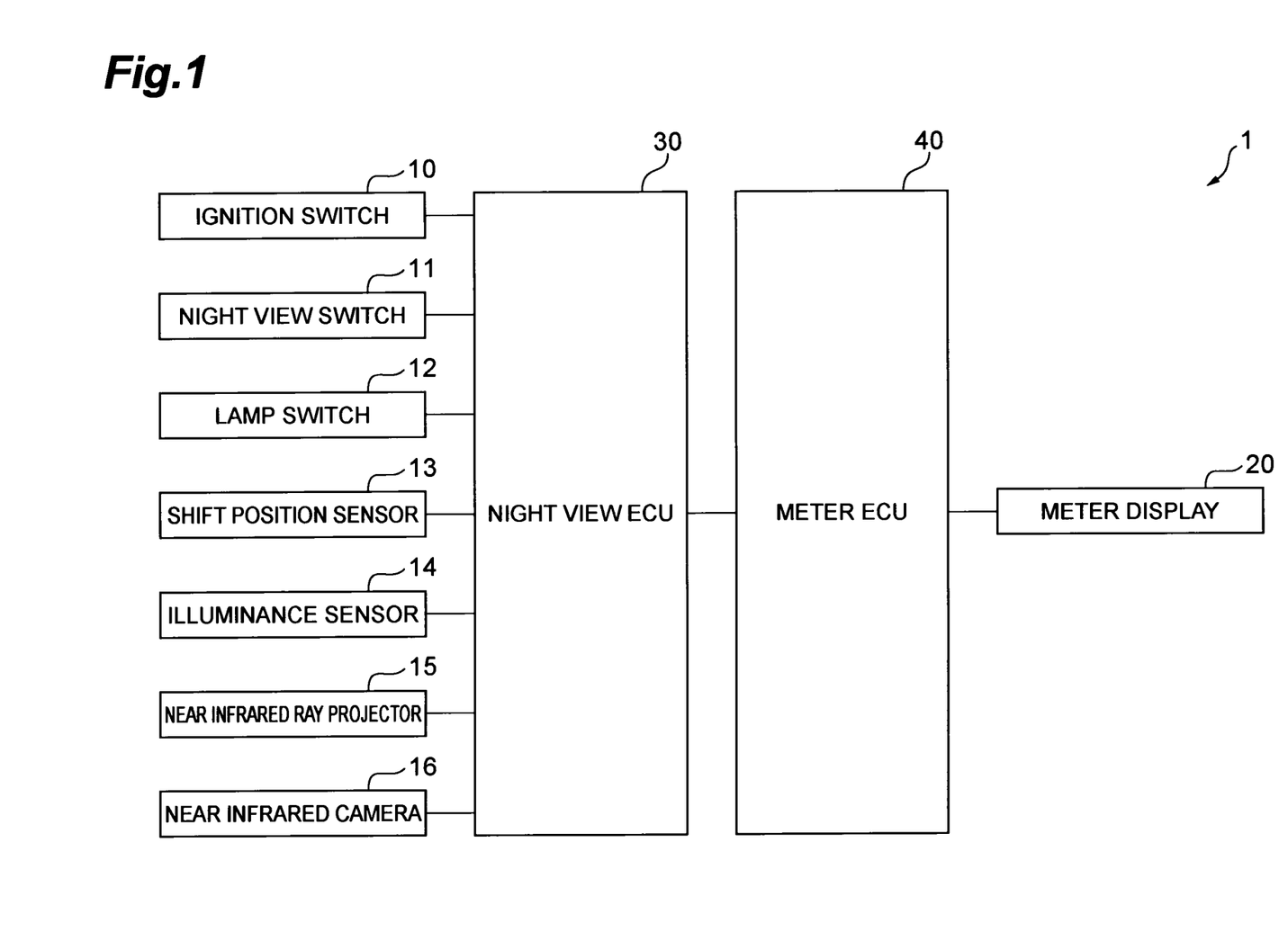
FIG. 1 is a configuration diagram of a night view system according to this embodiment.
Figure 2:
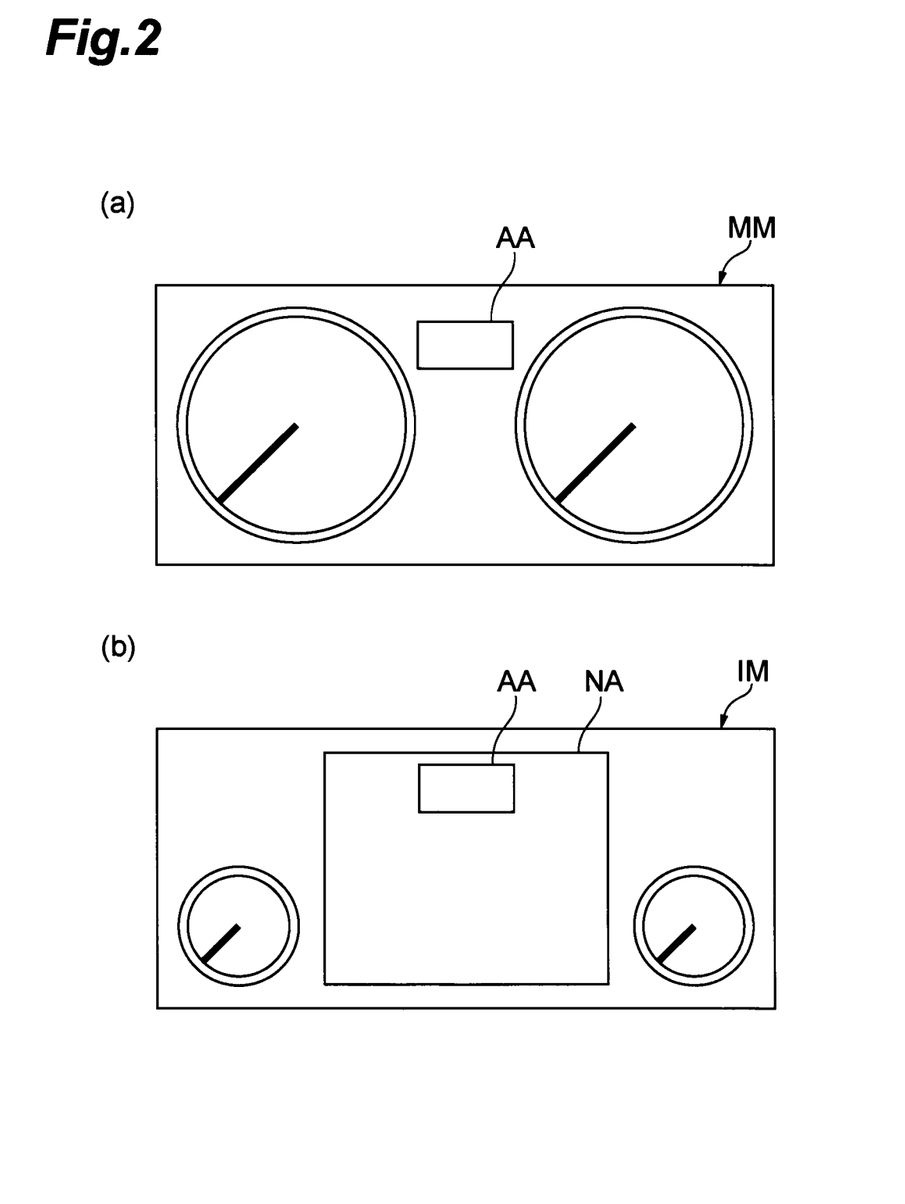
FIG. 2 shows a screen mode of a meter display in the night view system of FIG. 1, specifically, (a) shows a meter display mode and (b) shows a night view video display mode.

A night view system 1 according to this embodiment will be described with reference to FIGS. 1 and 2. FIG. 1 is a configuration diagram of the night view system according to this embodiment. FIG. 2 shows a screen mode of a meter display in the night view system of FIG. 1, specifically, (a) shows a meter display mode and (b) shows a night view video display mode.

The night view system 1 is a night-vision system using a near infrared ray, and shares a display for meter display. For this reason, the display for a meter has a normal meter display mode and a night view video display mode. In particular, in the night view system 1, in order to eliminate discomfort caused by switching of the screen design between the meter display mode and the night view video display mode, when it can be predicted that the display conditions of the night view video are temporarily satisfied, the screen design of the night view video display mode is not changed and the night view video is not displayed. To this end, the night view system 1 includes an ignition switch 10, a night view switch 11, a lamp switch 12, a shift position sensor 13, an illuminance sensor 14, a near infrared ray projector 15, a near infrared ray camera 16, a meter display 20, a night view ECU [Electronic Control Unit] 30, and a meter display 40.

In this embodiment, the meter display 40 corresponds to a display unit described in the appended claims, the near infrared ray camera 16 corresponds to an imaging unit described in the appended claims, and the night view switch 11, the lamp switch 12, the shift position sensor 13, and the illuminance sensor 14 correspond to a video display enable/disable input unit described in the appended claims. The night view switch 11 corresponds to a driver enable/disable input unit described in the appended claims, and the lamp switch 12, the shift position sensor 13, and the illuminance sensor 14 correspond to a vehicle state enable/disable input unit described in the appended claims. A display section of a night view video in the night view video display mode corresponds to a video display section described in the appended claims, and display sections of vehicle information in the meter display mode and the night view video display mode correspond to a travel information display section described in the appended claims. The night view ECU 30 and the meter ECU 40 correspond to a display modification unit described in the appended claims, and the night view ECU 30 corresponds to an input prediction unit described in the appended claims.

The display conditions of the night view video will be described. There are four display conditions. A first display condition is that the driver has an intention of using the night view video, which is determined by an operation of the night view switch 11. A second display condition is that it is in the nighttime, which is determined by illuminance around the vehicle. A third display condition is that the headlamp is turned on, which is determined by an operation of the lamp switch 12. A fourth display condition is that the vehicle is not backing (to prevent confusion with a back monitor), which is determined by a shift position detected by the shift position sensor 13. The first to third display conditions are the technical guide of the Ministry of Land, Infrastructure, Transport and Tourism regarding to display of the night view video. It is assumed that the vehicle is being driven, so the display conditions include the condition that the engine is in operation, which is determined by an operation of the ignition switch 10.

The ignition switch 10 is a switch which allows the driver to start the engine, and is provided to select one state of OFF, accessory ON, ignition ON, and engine start. The ignition switch 10 transmits selected switch information to the night view ECU 30 as an ignition signal.

The night view switch 11 is a switch which allows the driver to select ON/OFF of the night view system 1. The night view switch 11 transmits selected switch information to the night view ECU 30 as a night view signal.

The lamp switch 12 is a switch which allows the driver to select ON/OFF of lamps and, when the lamps are ON, a mode (a high beam headlamp mode, a low beam headlamp mode, and a small sidelight mode). The lamp switch 12 transmits selected switch information to the night view ECU 30 as a lamp signal.

The shift position sensor 13 is a sensor which detects the position of a shift lever (P (parking) range, R (reverse) range, N (neutral) range, and D (drive) range) selected by the driver. The shift position sensor 13 transmits the detected shift position to the night view ECU 30 as a shift position signal.

The illuminance sensor 14 is a sensor which detects the vehicle exterior illuminance. The illuminance sensor 14 transmits the detected illuminance to the night view ECU 30 as an illuminance signal.

The near infrared ray projector 15 is arranged at the front end (near the headlamp) of the vehicle and attached forward of the vehicle. The near infrared ray projector 15 irradiates a near infrared ray forward of the vehicle. The near infrared ray projector 15 works in conjunction with ON/OFF of the headlamp, such that the near infrared ray projector 15 is ON when the headlamp is ON and is OFF when the headlamp is OFF. Light irradiated from the headlamp includes a near infrared ray, the near infrared ray projector 15 may not be provided, but in terms of improvement in the night-vision effect, the near infrared ray projector 15 is preferably provided.

The near infrared ray camera 16 is arranged on the front side of the vehicle and attached forward of the vehicle. The near infrared ray camera 16 has a visible light cut filter, and imports a near infrared ray (reflected light of a near infrared ray from the near infrared ray projector 15) and generates near infrared images in grayscale according to the intensity of the near infrared ray. The near infrared ray images include an image which cannot be viewed by the driver with a naked eye. The near infrared ray image include near infrared ray images for a frame of every predetermined time (for example, 1/30 seconds). The near infrared ray camera 16 transmits near infrared ray image information of each frame to the night view ECU 30 for every predetermined time as a near infrared image signal.

The meter display 20 is a display for a meter. The meter display 20 is a color liquid crystal display over the entire surface, and may have various screen designs. When receiving a display signal from the meter ECU 40, the meter display 20 displays an image (video) according to the display signal.

As shown in FIG. 2, the meter display 20 has two screen designs of a meter display mode MM and a night view video display mode IM. The meter display mode MM is a normal mode of a meter, and has a display section of various kinds of vehicle information (for example, a speedometer, a tachometer, a water temperature meter, a fuel gauge, an odometer/tripmeter, various warning lights, a turn indicator, and a shift position) provided in the general meters and an advice display section AA at the upper part of the central portion of the screen. The night view video display mode IM is a mode for displaying a night view video, and has a display section NA of a night view video in the central portion of the screen, display sections of various kinds of minimum vehicle information (for example, a speedometer, a tachometer, a turn indicator, and a shift position) on the left and right sides of the display section NA, and an advice display section AA at the upper part of the central portion of the screen in the display section NA. The advice display section AA has the same size and is arranged at the same position in the meter display mode MM and the night view video display mode IM, and displays various messages which are notified to the driver.

The night view ECU 30 includes a CPU [Central Processing Unit], a ROM [Read Only Memory], a RAM [Random Access Memory], and an image processor, and performs overall control of the night view system 1. The night view ECU 30 receives various signals from the ignition switch 10, the night view switch 11, the lamp switch 12, the shift position sensor 13, and the illuminance sensor 14 for every predetermined time. Then, the night view ECU 30 determines whether to display the night view video or not on the basis of various signals, when the night view video can be displayed, provides the night view video to the meter ECU 40, and when the night view video cannot be displayed, provides an advice message to the meter ECU 40.

When the engine is started on the basis of the ignition signal from the ignition switch 10 (or in the case of ignition ON), the night view ECU 30 determines whether an operation is made to switch the night view system 1 from OFF to ON or not on the basis of the night view signal from the night view switch 11. When it is determined that the ON operation of the night view system 1 is made (that is, the driver has an intention of displaying the night view video), the night view ECU 30 activates the night view system 1 and operates the near infrared ray camera 16. The night view ECU 30 also determines whether an ON operation of the headlamp is made or not on the basis of the lamp signal from the lamp switch 12. When it is determined that the ON operation of the headlamp is made by the lamp switch 12, the night view ECU 30 turns on the near infrared ray projector 15. Then, the night view ECU 30 receives a near infrared ray image signal from the near infrared ray camera 16 for every predetermined time, and generates an image (night view video) for meter display from the near infrared ray image signal.

When it is determined that the ON operation of the night view system 1 is made, the night view ECU 30 determines whether the illuminance is smaller than a threshold value or not on the basis of the illuminance signal from the illuminance sensor 14, whether the ON operation of the headlamp is made or not on the basis of the lamp signal from the lamp switch 12, and whether the shift position is out of the R range or not on the basis of the shift position signal from the shift position sensor 13. The threshold value is a threshold value which is used to determine whether it is in the nighttime or not on the basis of the illuminance, and set in advance by an experiment or the like.

When it is determined that the illuminance is smaller than the threshold value (it is in the nighttime), the ON operation of the headlamp is made (the headlamp is turned on), and the shift position is out of the R range (the vehicle is not backing) (that is, when the conditions for display of the night view video based on the vehicle states (including the states around the vehicle) are all satisfied), the night view ECU 30 transmits a display control signal indicating display of the night view video in the night view video display mode and a video signal including night view video information for meter display to the meter ECU 40.

When it is determined that the illuminance is equal to or larger than the threshold value (when, from the conditions for display of the night view video, the condition that it is in the nighttime is not satisfied), the night view ECU 30 transmits a display control signal indicating advice display in the meter display mode and an advice signal indicating an advice message "please use at nighttime" to the meter ECU 40.

When it is determined that the OFF operation of the headlamp is made (when, from the conditions for display of the night view video, the condition that the headlamp is turned on is not satisfied), the night view ECU 30 transmits a display control signal indicating non-display of the night view video and advice display in the night view video display mode and an advice signal indicating an advice message "please turn on headlamp" to the meter ECU 40.

When it is determined that the shift position is in the R range (when, from the conditions for display of the night view video, the condition that the vehicle is not backing is not satisfied), the night view ECU 30 transmits a display control signal indicating non-display of the night view video and advice display in the night view video display mode and an advice signal indicating an advice message "not displayed during backing" to the meter ECU 40.

When the night view system 1 is running, the night view ECU 30 determines whether an operation is made to switch the night view system 1 from ON to OFF or not on the basis of the night view signal from the night view switch 11. When it is determined that the OFF operation of the night view system 1 is made (that is, when the driver has no intention for displaying the night view video), the night view ECU 30 stops imaging by the near infrared ray camera 16 and lighting of the near infrared ray projector 15 and transmits a display control signal indicating non-display of the night view video according to the stoppage of the system to the meter ECU 40, thereby stopping the night view system 1.

When the night view system 1 is running and the night view video is being displayed in the night view video display mode, the night view ECU 30 determines whether the illuminance is equal to or larger than the threshold value or not on the basis of the illuminance signal from the illuminance sensor 14, whether an operation is made to switch the headlamp from ON to OFF or not on the basis of the lamp signal from the lamp switch 12, or whether the shift position is shifted from a range other than the R range in the R range or not on the basis of the shift position signal from the shift position sensor 13.

When it is determined that the illuminance is equal to or larger than the threshold value, the night view ECU 30 transmits a display control signal indicating advice display in the meter display mode and an advice signal indicating an advice message "please use at nighttime" to the meter ECU 40.

When it is determined that the OFF operation of the headlamp is made, the night view ECU 30 transmits a display control signal indicating non-display of the night view video and advice display in the night view video display mode and an advice signal indicating an advice message "please turn on headlamp" to the meter ECU 40.

When it is determined that the shift position is in the R range, the night view ECU 30 transmits a display control signal indicating non-display of the night view video and advice display in the night view video display mode and an advice signal indicating an advice message "not displayed during backing" to the meter ECU 40.

The meter ECU 40 includes a CPU, a ROM, a RAM, an image processor, and the like, and performs overall control of the meter system. Usually, the meter display 40 generates a display image in the meter display mode for displaying various kinds of vehicle information on the basis of the detection signals from the sensors detecting various vehicle states or warning signals from various ECUs for every predetermined time, and transmits a display signal including the image information to the meter display 20.

In particular, when receiving various signals from the night view ECU 30, the meter display 40 determines whether the meter display mode or the night view video display mode is carried out from various signals, generates a display image in the determined mode, and transmits a display signal including the image information to the meter display 20.

When receiving a display control signal indicating display of the night view video in the night view video display mode and a video signal including night view video information for meter display, the meter ECU 40 determines that the night view video display mode for displaying the night view video is carried out, generates a display image in the night view video display mode for displaying minimum vehicle information and the night view video on the night view video display section NA, and transmits a display signal including the image information to the meter display 20.

When receiving a display control indicating advice display in the meter display mode and an advice signal indicating an advice message "please use at nighttime", the meter ECU 40 determines that the meter display mode for displaying an advice is carried out, generates a display image for displaying various kinds of vehicle information and "please use at nighttime" on the advice display section AA, and transmits a display signal including the image information to the meter display 20.

When receiving a display control signal indicating non-display of the night view video and advice display in the night view video display mode and an advice signal indicating an advice message "please turn on headlamp", the meter ECU 40 determines that the night view video display mode for displaying an advice is carried out, generates a display image in the night view video display mode for displaying various kinds of minimum vehicle information, "please turn on headlamp" on the advice display section AA, and a black image on the night view video display section NA, and transmits a display signal including the image information to the meter display 20.

When receiving a display control signal indicating non-display of the night view video and advice display in the night view video display mode and an advice signal indicating an advice message "not displayed during backing", the meter ECU 40 determines that the night view video display mode for displaying an advice is carried out, generates a display image in the night view video display mode for displaying various kinds of minimum vehicle information, "not displayed during backing" on the advice display section AA, and a black image on the night view video display section NA, and transmits a display signal including the image information to the meter display 20.

When receiving a display control signal indicating non-display of the night view video according to the stoppage of the system, the meter ECU 40 determines that the normal meter display mode is carried out, and transmits a display signal of the meter display mode for displaying various kinds of vehicle information to the meter display 20 in the same manner as described above.

The operation of the night view system 1 will be described with reference to FIGS. 1 and 2. The engine is started by an operation of the driver. The operation from when the night view system 1 is activated by an operation of the driver until the night view system 1 stops will be described.

The ignition switch 10 transmits switch information operated by the driver to the night view ECU 30 as the ignition signal. The night view switch 11 transmits ON/OFF operation information of the night view system 1 operated by the driver to the night view ECU 30 as the night view signal. The lamp switch 12 transmits switch information operated by the driver to the night view ECU 30 as the lamp signal. The shift position sensor 13 detects a shift position operated by the driver, and transmits the shift position to the night view ECU 30 as the shift position signal. The illuminance sensor 14 detects illuminance around the vehicle, and transmits the illuminance to the night view ECU 30 as the illuminance signal. The night view ECU 30 receives these signals for every predetermined time.

When the engine is running, the night view ECU 30 determines whether an operation is made to switch the night view system 1 from OFF to ON or not on the basis of the night view signal. When it is determined that the ON operation of the night view system 1 is made by the driver, the night view ECU 30 activates the night view system 1 and activates the near infrared ray camera 16. The night view ECU 30 also determines whether the ON operation of the headlamp is made or not on the basis of the lamp signal. When it is determined that the ON operation of the headlamp is made by the driver, the night view ECU 30 turns on the near infrared ray projector 15. If turned on, the near infrared ray projector 15 irradiates a near infrared ray forward of the vehicle. If activated, the near infrared ray camera 16 imports a near infrared ray to form a near infrared ray image, and transmits a near infrared ray image signal including near infrared ray image information of each frame to the night view ECU 30 for every predetermined time. The night view ECU 30 receives the near infrared ray image signal from the near infrared ray camera 16 for every predetermined time, and generates a night view video for meter display from the near infrared ray image signal.

When it is determined that the ON operation of the night view system 1 is made by the driver, the night view ECU 30 determines whether the illuminance is smaller than the threshold value or not on the basis of the illuminance signal, whether the ON operation of the headlamp is made or not on the basis of the lamp signal, and whether the shift position is out of the R range or not on the basis of the shift position signal.

When it is determined that the illuminance is smaller than the threshold value, the ON operation of the headlamp is made by the driver, and a range other than the R range is selected by the driver, the night view ECU 30 transmits a display control signal indicating display of the night view video in the night view video display mode and a video signal including night view video information for meter display to the meter ECU 40. When receiving the signals, the meter ECU 40 determines that the normal meter display mode is switched to the night view video display mode for displaying the night view video, generates a display image in the night view video display mode for displaying minimum vehicle information on the left and right sides of the night view video display section NA and displaying the night view video on the night view video display section NA, and transmits the display signal to the meter display 20. When receiving the display signal, the meter display 20 is switched from the image in the normal meter display mode MM, and displays an image in which the night view video is displayed on the night view video display section NA in the night view video display mode IM.

Figure 3:
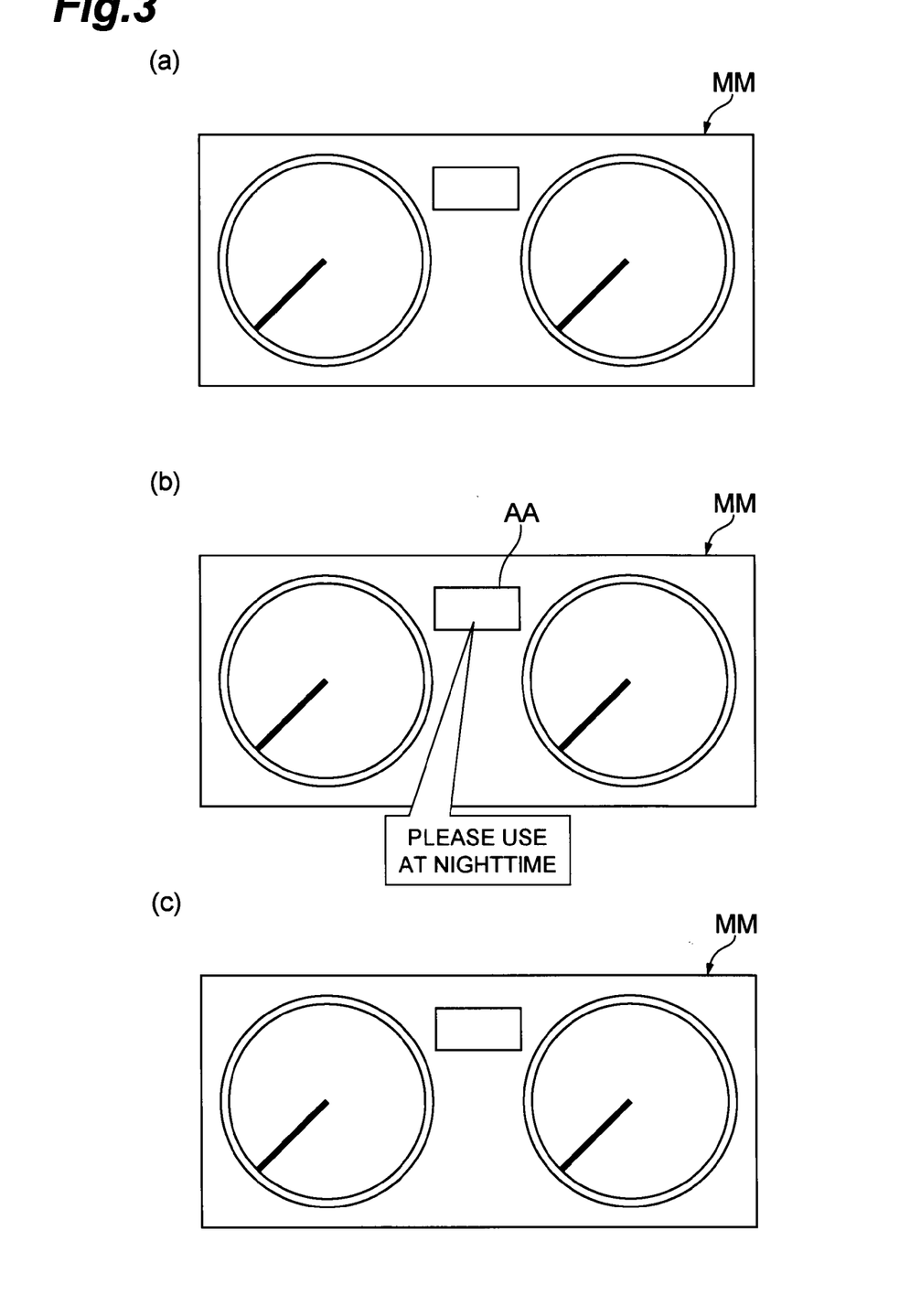
FIG. 3 shows screen transition of a meter display in the case that it is not in the nighttime when a night view switch in the night view system of FIG. 1 is turned on, specifically, (a) shows a meter display mode when the night view switch is turned off, (b) shows an advice display in the meter display mode, and (c) shows the meter display mode after advice display.

When it is not in the nighttime and it is not dark, it is determined that the illuminance is equal to or larger than the threshold value, and the night view ECU 30 transmits a display control signal indicating advice display in the meter display mode and an advice signal indicating "please use at nighttime" to the meter ECU 40. When receiving these signals, the meter ECU 40 determines that advice display is required in the meter display mode, generates a display image in the meter display mode with various kinds of vehicle information and "please use at nighttime" on the advice display section AA, and transmits the display signal to the meter display 20. When receiving the display signal, the meter display 20 is switched from the image in the normal meter display mode MM shown in FIG. 3(a), and displays an image shown in FIG. 3(b) with "please use at nighttime" on the advice display section AA in the meter display mode MM. In this case, even if the driver conducts the ON operation of the night view system 1 and has an intention for displaying the night view video, the night view video cannot be displayed until the surroundings of the vehicle become dark. Thus, in order to return the meter display mode with no advice display after a predetermined time, the meter ECU 40 generates a display image in the normal meter display mode indicating various kinds of vehicle information, and transmits the display signal to the meter display 20. When receiving the display signal, the meter display 20 is switched from the image shown in FIG. 3(b) with advice display in the meter display mode MM, and displays an image shown in FIG. 3(c) with no advice display in the meter display mode MM.

Figure 4:
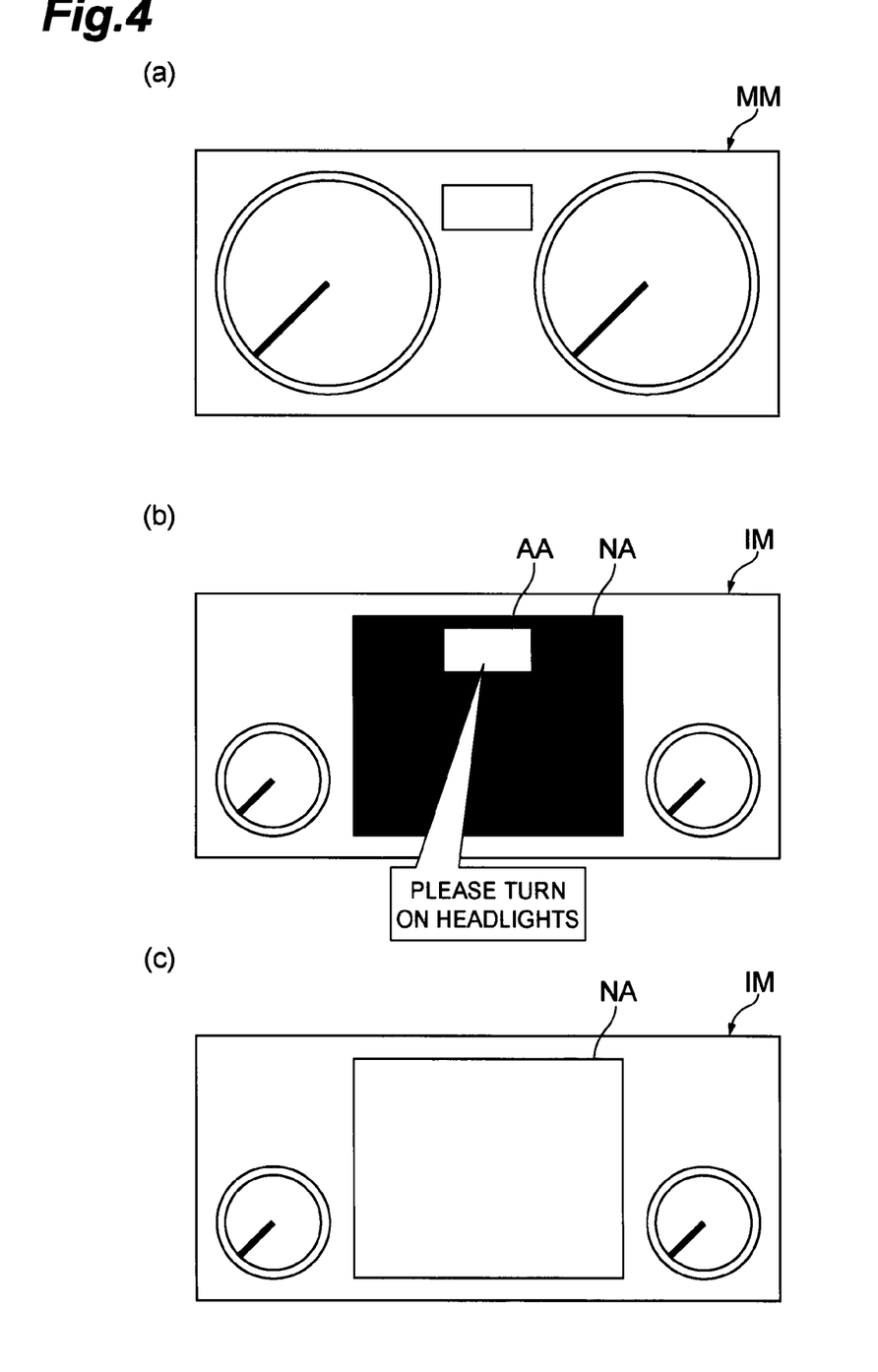

When the headlamp is not turned on, it is determined that the ON operation of the headlamp is not made by the driver, and the night view ECU 30 transmits a display control signal indicating non-display of the night view video and advice display in the night view video display mode and an advice signal indicating "please turn on headlamp" to the meter ECU 40. When receiving these signals, the meter ECU 40 determines that the normal meter display mode is switched to the night view video display mode for displaying an advice, generates a display image in the night view video display mode for displaying minimum vehicle information on the left and right sides of the night view video display section NA, a black image on the night view video display section NA, and "please turn on headlamp" on the advice display section AA, and transmits the display signal to the meter display 20. When receiving the display signal, the meter display 20 is switched from the image in the normal meter display mode MM shown in FIG. 4(a), and displays an image shown in FIG. 4(b) with a black image on the night view video display section NA and "please turn on headlamp" on the advice display section AA in the night view video display mode IM. In this case, the driver conducts the ON operation of the night view system 1 and has an intention for displaying the night view video, so it can be predicted that the headlamp is immediately turned on so as to display the night view video. Thus, the night view ECU 30 determines whether an operation is made to switch the headlamp from OFF to ON or not on the basis of the lamp signal, and continuously waits until the ON operation of the headlamp is made. When it is determined that the ON operation of the headlamp is made, the night view ECU 30 transmits a display control signal indicating display of the night view video in the night view video display mode and a video signal to the meter ECU 40. When receiving these signals, the meter ECU 40 determines that the night view video display mode in which the night view video is not displayed is switched to the night view video display mode in which the night view video is displayed, generates a display image in the night view video display mode for displaying minimum vehicle information on the left and night view video display section NA and the night view video on the night view video display section NA, and transmits the display signal to the meter display 20. When receiving the display signal, the meter display 20 is switched from the image shown in FIG. 4(*b*) with no night view video in the night view video display mode IM, and displays an image shown in FIG. 4(*c*) with the night view video on the night view video display section NA in the night view video display mode IM.

Figure 5:
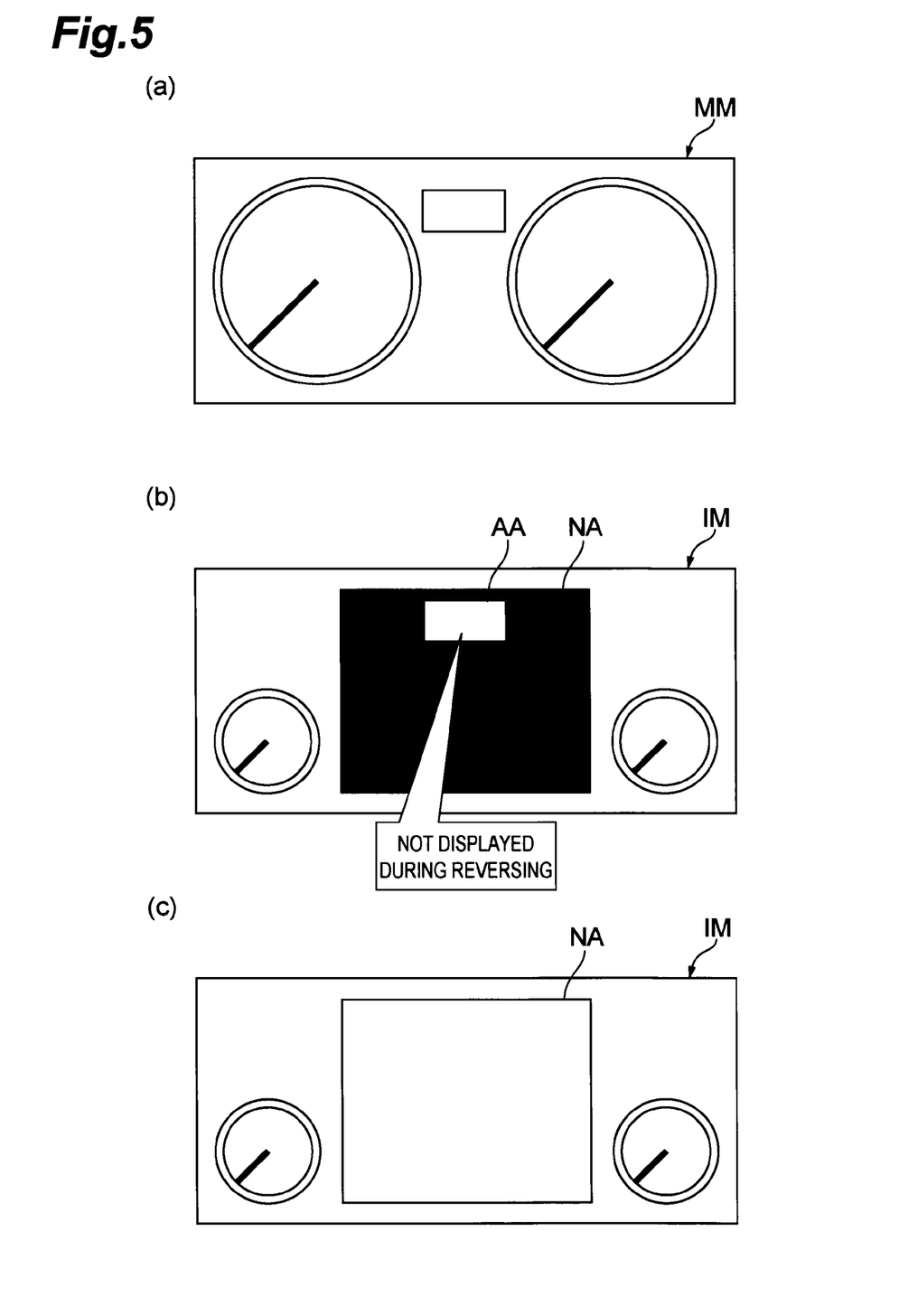
FIG. 5 shows screen transition of a meter display in the case that a shift position is in an R range when a night view switch in the night view system of FIG. 1 is turned on, specifically, (a) shows a meter display mode when the night view switch is turned off, (b) shows advice display in a night view video display mode according to the R range, and (c) shows the night view video display mode according to a range other than the R range.

When the vehicle is backing, it is determined that the R range is selected by the driver, and the night view ECU 30 transmits a display signal indicating non-display of the night view video and advice display in the night view video display mode and an advice signal indicating "not displayed during backing" to the meter ECU 40. When receiving these signals, the meter ECU 40 determines that the normal meter display mode is switched to the night view video display mode for displaying an advice, generates a display image in the night view video display mode for displaying minimum vehicle information on the left and right sides of the night view video display section NA, a black image on the night view video display section NA, and "not displayed during backing" on the advice display section AA, and transmits the display signal to the meter display 20. When receiving the display signal, the meter display 20 is switched from the image in the normal meter display mode MM shown in FIG. 5(*a*), and displays an image shown in FIG. 5(*b*) with the black image on the night view video display section NA and "not displayed during backing" on the advice display section AA in the night view video display mode IM. In this case, the driver conducts the ON operation of the night view system 1 and has an intention for displaying the night view video, so it can be predicted that the shift position is shifted to a range other than the R range after backing of the vehicle. Thus, the night view ECU 30 determines whether the shift position is shifted to a range other than the R range or not on the basis of the shift position signal, and continuously waits until the shift position is shifted to a range other than the R range. When it is determined that the shift position is shifted to a range other than the R range, the night view ECU 30 transmits a display control signal indicating display of the night view video in the night view video display mode and a video signal to the meter ECU 40. When receiving these signals, the meter ECU 40 determines that the night view video display mode in which the night view video is not displayed is switched to the night view video display mode in which the night view video is displayed, generates a display image in the night view video display mode for displaying minimum vehicle information on the left and right sides of the night view video display section NA and the night view video on the night view video display section NA, and transmits the display signal to the meter display 20. When receiving the display signal, the meter display 20 is switched from the image shown in FIG. 5(*b*) with no night view video in the night view video display mode IM, and displays an image shown in FIG. 5(*c*) with the night view video on the night view video display section NA in the night view video display mode IM.

When the night view system 1 is running, the night view ECU 30 determined whether an operation is made to switch the night view system 1 from ON to OFF or not on the basis of the night view signal. When it is determined that the ON operation of the night view system 1 is made by the driver, the night view ECU 30 stops the near infrared ray camera 16 and the near infrared ray projector 15 and transmits a display control signal indicating non-display of the night view video according to the stoppage of the system to the meter ECU 40, thereby stopping the night view system 1. The near infrared ray camera 16 stops imaging when being stopped. The near infrared ray projector 15 stops irradiation of the near infrared ray when being stopped. When receiving the display control signal, the meter ECU 40 determines that the night view video display mode is switched to the normal meter display mode, and transmits a display signal of the meter display mode for displaying various kinds of vehicle information to the meter display 20 in the same manner as described above. When receiving the display signal, the meter display 20 is switched from the image with the night view video on the night view video display section NA in the night view video display mode IM, and displays the image in the normal meter display mode MM.

When the night view system 1 is running, and the night view video is being displayed in the night view video display mode IM, the night view ECU 30 determines whether the illumination is equal to or larger than the threshold value or not on the basis of the illuminance signal, whether an operation is made to switch the headlamp from ON to OFF or not on the basis of the lamp signal, or whether the shift position is shifted from a range other than the R range to the R range or not on the basis of the shift position signal.

Figure 6:
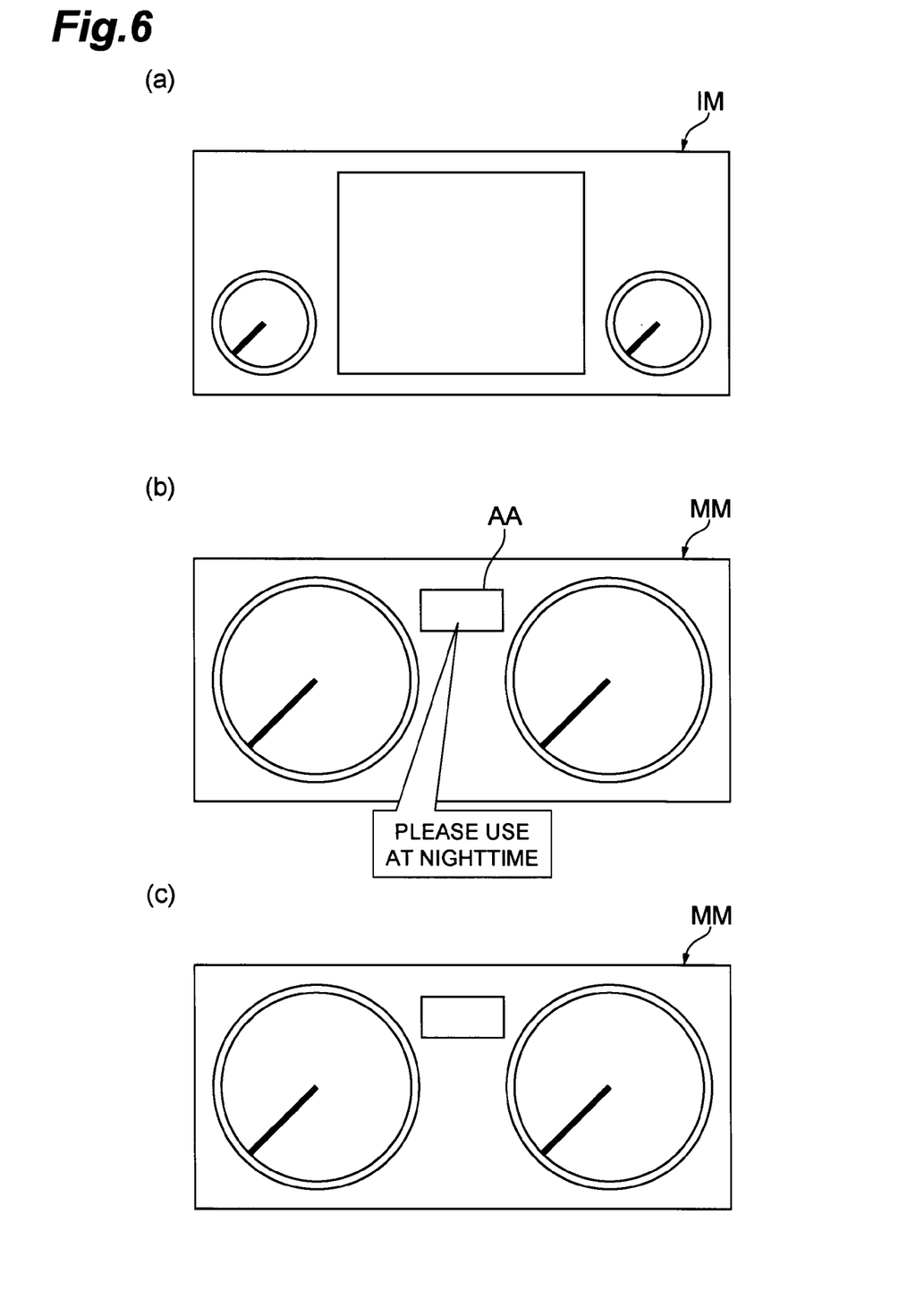
FIG. 6 shows screen transition of a meter display in the case that it is in the daybreak when a night view switch in the night view system of FIG. 1 is turned on, specifically, (a) shows a night view video display mode, (b) shows advice display in the meter display mode when it is in the nighttime, and (c) shows the meter display mode after advice display.

When it becomes bright and it is not in the nighttime, it is determined that the illumination is equal to or larger than the threshold value, the night view ECU 30 transmits a display control signal indicating advice display in the meter display mode and an advice signal indicating "please use at nighttime" to the meter ECU 40. When receiving these signals, the meter ECU 40 determines that the night view video display mode is switched to the meter display mode in which advice display is required, generates a display image in the meter display mode with various kinds of vehicle information and "please use at nighttime" on the advice display section AA, and transmits the display signal to the meter display 20. When receiving the display signal, the meter display 20 is switched from the image in the night view video display mode IM shown in FIG. 6(*a*) with the night view video, and displays an image shown in FIG. 6(*b*) with "please use at nighttime" on the advice display section AA in the meter display mode MM. In this case, although the driver conducts the ON operation of the night view system 1 and has an intention for displaying the night view video, the night view video cannot be displayed since the surroundings of the vehicle becomes bright. Thus, the meter ECU 40 generates a display image in the normal meter display mode indicating various kinds of vehicle information after a predetermined time, and transmits the display signal to the meter display 20. When receiving the display signal, the meter display 20 is switched from the image shown in FIG. 6(*b*) with advice display in the meter display mode MM, and displays an image shown in FIG. 6(*c*) with no advice display in the meter display mode MM.

Figure 7:
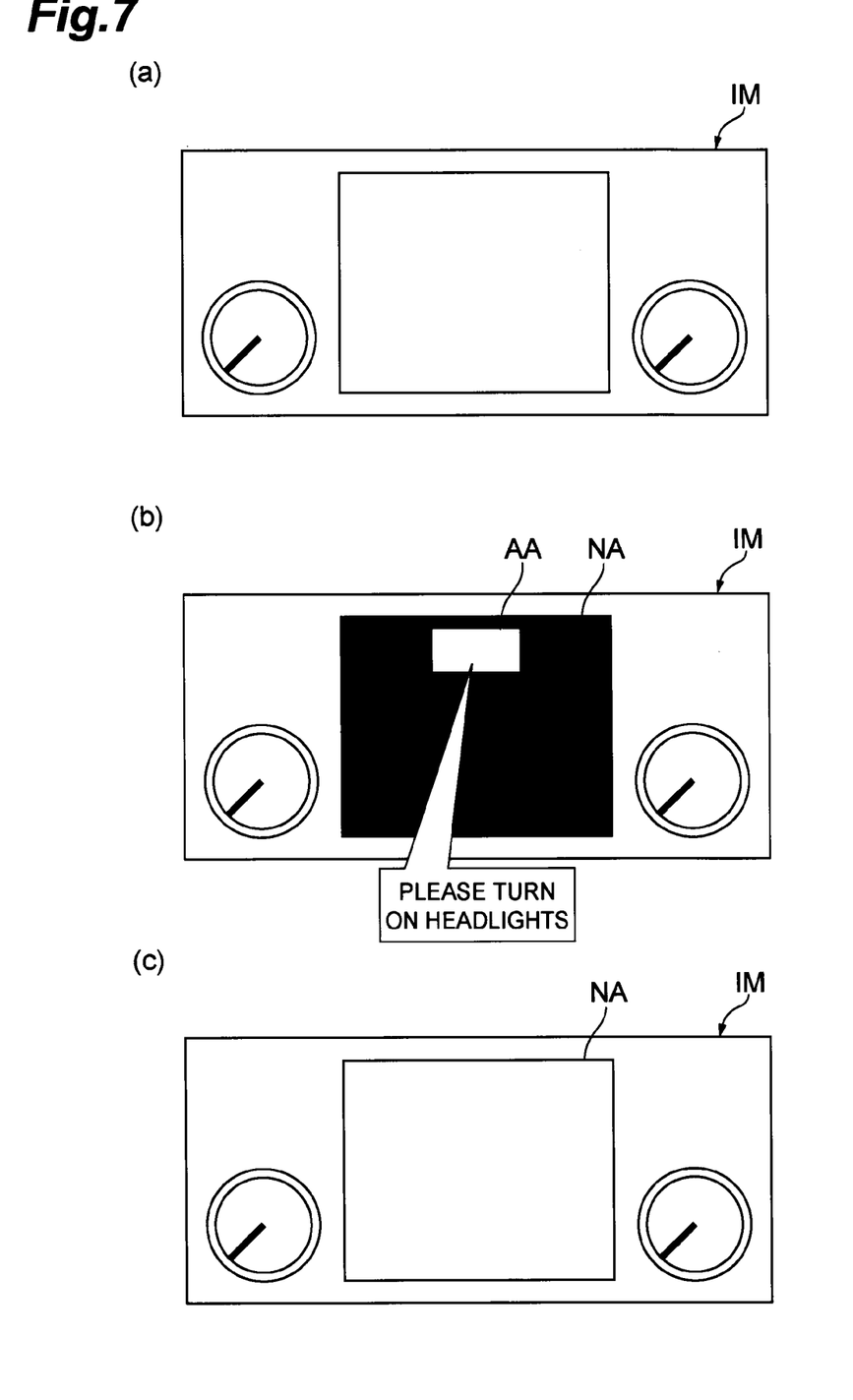

When the headlamp is temporarily turned off, for example, when the vehicle is stopped at a red light, it is determined that the OFF operation of the headlamp is made by the driver, and the night view ECU 30 transmits a display control signal indicating non-display of the night view video and advice display in the night view video display mode and an advice signal indicating "please turn on headlamp" to the meter ECU 40. When receiving these signals, the meter ECU 40 determines that the night view video display mode in which the night view video is displayed is switched to the night view video display mode in which an advice is displayed, generates a display image in the night view video display mode for displaying minimum vehicle information on the left and right sides of the night view video display section NA, a black image on the night view video display section NA, and "please turn on headlamp" on the advice display section AA, and transmits the display signal to the meter display 20. When receiving the display signal, the meter display 20 is switched from the image shown in FIG. 7(*a*) with the night view video in the night view video display mode IM, and displays an image shown in FIG. 7(*b*) with the black image on the night view video display section NA and "please turn on headlamp" on the advice display section AA in the night view video display mode IM. In this case, the driver conducts the ON operation of the night view system 1 and has an intention for displaying the night view video, it can be predicted that the headlamp is temporarily turned off (that is, it can be predicted that the headlamp is turned on after a predetermined time at which the traffic signal is changed from red to blue). Thus, the night view ECU 30 determines whether an operation is made to switch the head lamp from OFF to ON or not on the basis of the lamp signal, and continuously waits until the ON operation of the headlamp is made. When it is determined that the ON operation of the headlamp is made, the night view ECU 30 transmits a display control signal indicating display of the night view video in the night view video display mode and a video signal to the meter ECU 40. When receiving these signals, the meter ECU 40 determines that the night view video display mode in which the night view video is not displayed is switched to the night view video display mode in which the night view video is displayed, generates a display image in the night view video display mode for displaying minimum vehicle information on the left and right sides of the night view video display section NA and the night view video on the night view video display section NA, and transmits the display signal to the meter display 20. When receiving the display signal, the meter display 20 is switched from the image shown in FIG. 7(*b*) with no night view video in the night view video display mode IM, and displays an image shown in FIG. 7(*c*) with the night view video on the night view video display section NA in the night view video display mode IM. Therefore, even when the headlamp is temporarily turned off while the vehicle waits for the traffic light to change, with regard to the screen design in the meter display 20, the night view video display mode IM is continued while the black image is displayed on the night view video display section NA.

Figure 8:
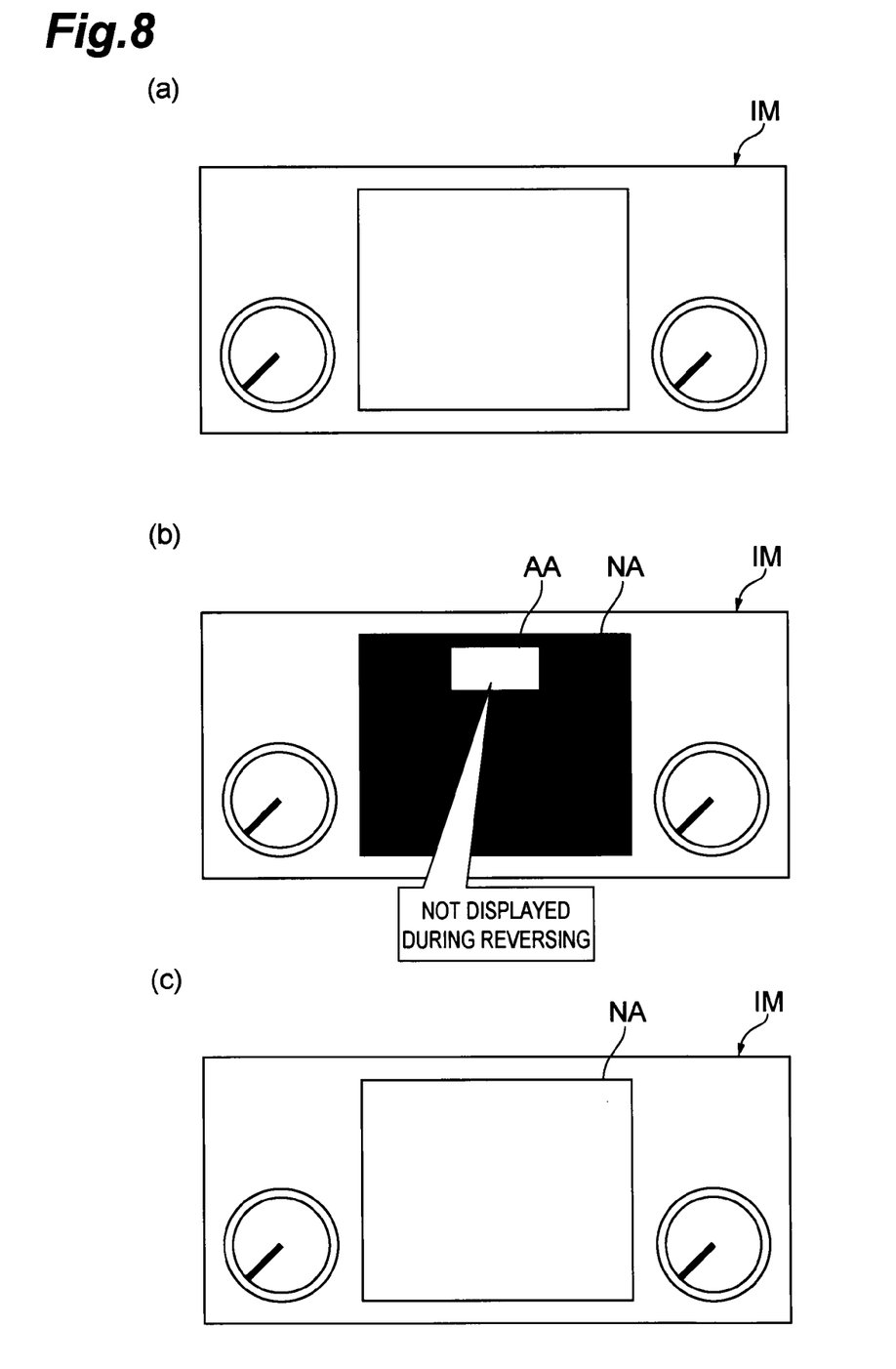
FIG. 8 shows screen transition of a meter display in the case that a shift position is shifted in an R range when a night view switch in the night view system of FIG. 1 is turned on, specifically, (a) shows a night view video display mode, (b) shows advice display in the night view video display mode according to the R range, and (c) shows the night view video display mode according to a range other than the R range.

When the vehicle is temporarily backing, for example, the vehicle turns back, it is determined that the R range is selected by the driver, and the night view ECU 30 transmits a display control signal indicating non-display of the night view video and advice display in the night view video display mode and an advice signal indicating "not displayed during backing" to the meter ECU 40. When receiving these signals, the meter ECU 40 determines that the night view video display mode in which the night view video is displayed is switched to the night view video display mode in which advice display is performed, generates a display image in the night view video display mode for displaying minimum vehicle information on the left and right sides of the night view video display section NA, a black image on the night view video display section NA, and "not displayed during backing" on the advice display section AA, and transmits the display signal to the meter display 20. When receiving the display signal, the meter display 20 is switched from the image shown in FIG. 8(*a*) with the night view video in the night view video display mode IM, and displays an image shown in FIG. 8(*b*) with the black image on the night view video display section NA and "not displayed during backing" on the advice display section AA in the night view video display mode IM. In this case, the driver conducts the ON operation of the night view system 1 and has an intention for displaying the night view video, and it can be predicted that the vehicle is temporarily backing as required (that is, it can be predicted that the shift position is shifted to the D range after a predetermined time at which turn-back is carried out). Thus, the night view ECU 30 determines whether the shift position is shifted to a range other than the R range or not on the basis of the shift position signal, and continuously waits until the shift position is shifted to a range other than the R range. When it is determined that the shift position is shifted to a range other than the R range, the night view ECU 30 transmits a display control signal indicating display of the night view video in the night view video display mode and a video signal to the meter ECU 40. When receiving these signals, the meter ECU 40 determines that the night view video display mode in which the night view video is not displayed is switched to the night view video display mode in which the night view video is displayed, generates a display image in the night view video display mode for displaying minimum vehicle information on the left and right sides of the night view video display section NA and the night view video on the night view video display section NA, and transmits the display signal to the meter display 20. When receiving the display signal, the meter display 20 is switched from the image shown in FIG. 8(*b*) with no night view video in the night view video display mode IM, and displays an image shown in FIG. 8(*c*) with the night view video on the night view video display section NA in the night view video display mode IM. Therefore, even when the vehicle is temporarily backing for turn-back, with regard to the screen design of the meter display 20, the night view video display mode IM is continued while the black image is displayed on the night view video display section NA.

With the night view system 1, when the driver has an intention for displaying the night view video, if it can be predicted that the display conditions of the night view video are not satisfied temporarily, the screen design is not switched from the night view video display mode, so there is no case where the screen design is frequently switched between the meter display mode and the night view video display mode. As a result, the driver is not bothered caused by a significant change of the screen design and feels less discomfort. With the night view system, when the display mode is switched to the meter display mode, the ON operation of the night view switch should be made again, so bothersome of a switch operation due to switching to the meter display mode is eliminated.

With the night view system 1, even if the driver has an intention for displaying the night view video, when the night view video is not displayed, advice display is performed, so the driver can recognize why the night view video is not displayed. With the night view system 1, the arrangement or size of the advice display section AA is changed between the meter display mode and the night view video display mode, so the driver easily views advice display and is not bothered due to a position change.

Although the embodiment of the invention has been described, the invention is not limited to the foregoing embodiment and may be carried out in various forms.

For example, although in this embodiment, application is made to the night view system in which the night view video is displayed on the meter display, application may be made to other displays for navigation, in addition to the meter display, and to other images, such as detection images of obstacles (pedestrians or the like) around the vehicle or images of the back side of the vehicle, in addition to the night view video.

Although in this embodiment, the display conditions of the night view video include the driver's intention for using the night view video (night view switch ON), nighttime (the illuminance is smaller than the threshold value), headlamp ON (a light switch is ON), and not backing (the shift position is out of the R range), other conditions may be used as display conditions.

Although in this embodiment, the configuration is made such that, when the headlamp is OFF during the night view video display mode, it is predicted that the headlamp is ON or when the shift position is in the R range, it is predicted that the shift position is shifted to a range other than the R range after a predetermined time (that is, it is predicted that video display enable is input for a predetermined time), when input of video display enable/disable cannot be predicted, it may be predicted that video display enable will be input.

Although in this embodiment, the configuration is made such that, when the head lamp is OFF or the shift position is shifted to the R range while the night view video is being displayed, the black image is displayed on the night view video display section and advice display is performed in the night view video display mode, and it continuously waits for shift of the shift position, the display mode may be switched to the meter display mode when the headlamp is ON or the shift position is not shifted to a range other than the R range after a predetermined time, instead of waiting continuously.

Although in this embodiment, the configuration is made such that, when the display conditions of the night view video are not satisfied while the night view video is being displayed, the black image is displayed on the night view video display section without modifying the screen design of the night view video display mode (the size of the night view video display section), the display region of meters may be slightly increased or the size of the night view video display section may be slightly decreased to such an extent that the driver feels less discomfort.

Although in this embodiment, the configuration is made such that, when the headlamp is OFF or the shift position is shifted to the R range while the night view video is being displayed, the black image is displayed on the night view video display section, an image other than the black image may be used.

Although in this embodiment, the near infrared ray has been used, an infrared ray other than the near infrared ray may be used. For example, when a far infrared ray is used, a far infrared ray projector should not be provided.

Although in this embodiment, the on-vehicle display device is applied to the night view system, the on-vehicle display program may be applied to a program incorporated into an IC chip, a program stored in a storage medium, such as CD-ROM, or a program available through a network, such as Internet, and such a program may be executed by a computer to perform display control.

The invention claimed is:

1. An on-vehicle display device comprising:
a display unit including a screen;
an imaging unit capturing surroundings of a vehicle using an infrared ray at nighttime; and
control unit configured to:
  display a travel information area displaying travel information of the vehicle on the screen in a normal size and not display a video area displaying video captured by the imaging unit on the screen when a headlamp is in OFF or a gear is in R; and
  display the travel information area set to a smaller size than the normal size and the video area set to a predetermined size when the headlamp is in ON and the gear is in a position other than the R,
wherein when the headlamp is turned to OFF while the video area is displayed or when the gear is shifted into the R while the video area is displayed, the control unit:
  maintains, for a predetermined time, the size of both the video area and the travel information area displayed when the headlamp was in ON or the gear was in the position other than the R, or
  suppresses, for the predetermined time a degree of modification of the size of both the video area and the travel information area.

2. The on-vehicle display device according to claim 1, wherein the control unit displays a black image or an image other than the black image on the video area when the headlamp is turned to OFF when the video area is displayed or when the gear is shifted into the R while the video area is displayed.

3. The on-vehicle display device according to claim 1, wherein the display unit is a meter display or a display for navigation.

4. The on-vehicle display device according to claim 2, wherein the display unit is a meter display or a display for navigation.

5. A non-transitory computer readable medium storing an on-vehicle display program for displaying, on a display unit including a screen mounted on a vehicle, a video around the vehicle imaged by an imaging unit and travel information of the vehicle, the on-vehicle display program causing a computer to implement:
a control unit configured to:
  display a travel information area displaying travel information of the vehicle on the screen in a normal size and not display a video area displaying the video imaged by the imaging unit on the screen when a headlamp is in OFF or a gear is in R; and
  display the travel information area set to a smaller size than the normal size and the video area set to a predetermined size when the headlamp is in ON and the gear is in a position other than the R,
wherein, when the headlamp is turned to OFF while the video area is displayed or when the gear is shifted into the R while the video area is displayed, the control unit:
  maintains, for a predetermined time, the size of both the video area and the travel information area displayed when the headlamp was in ON or the gear was in the position other than the R, or
  suppresses, for the predetermined time, a degree of modification of the size of both the video area and the travel information area.

6. The on-vehicle display device according to claim 1, wherein control unit displays a black image on the screen when the headlamp is turned to OFF while the video area is displayed or when the gear is shifted into the R while the video area is displayed.

7. The on-vehicle display device according to claim 1, wherein setting the size of the travel information area to the smaller size than the normal size includes continuing to display the travel information of the vehicle in the travel information area of the smaller size.

8. The on-vehicle display device according to claim 1, further comprising an input device configured to input a driver operation for displaying the video area, wherein
in the case that the control unit receives the driver operation from the input device, the control unit displays the travel information area in the normal size and does not display the video area when the headlamp is in OFF or the gear is in the R, in the case that the control unit receives the driver operation from the input device, the control unit displays the travel information area set to the smaller size than the normal size and the video area set to the predetermined size when the headlamp is in ON and the gear is in the position other than the R, and in the case that the control unit receives the driver operation from the input device, when the headlamp is turned to OFF while the video area is displayed or when the gear is shifted into the R while the video area is displayed, the control unit:

maintains, for the predetermined time, the size of both the video area and the travel information area displayed when the headlamp was in ON or the gear was in the position other than the R, or suppresses, for the predetermined time, the degree of modification of the size of both the video area and the travel information area.

9. The on-vehicle display device according to claim 1, further comprising an illuminance sensor configured to detect illuminance of the vehicle exterior, wherein the control unit determines whether the illuminance is smaller than a predetermined value or not, in the case that the illuminance is not smaller than the predetermined value, the control unit displays the travel information area in the normal size and does not display the video area when the headlamp is in OFF or the gear is in the R, in the case that the illuminance is not smaller than the predetermined value, the control unit displays the travel information area set to the smaller size than the normal size and the video area set to the predetermined size when the headlamp is in ON and the gear is in the position other than the R, and in the case that the illuminance is not smaller than the predetermined value, when the headlamp is turned to OFF while the video area is displayed or when the gear is shifted into the R while the video area is displayed, the control unit:

maintains, for the predetermined time, the size of both the video area and the travel information area displayed when the headlamp was in ON or the gear was in the position other than the R, or suppresses, for the predetermined time, the degree of modification of the size of both the video area and the travel information area.

10. The on-vehicle display device according to claim 1, wherein the control unit displays an image associated with OFF of the headlamp or the R of the gear in the video area for the predetermined time when the headlamp is turned to OFF while the video area is displayed or when the gear is shifted into the R while the video area is displayed, and the control unit displays the video captured by the imaging unit in the video area when the headlamp is turned to ON while the image is displayed in the video area or when the gear is shifted into the position other than the R while the image is displayed in the video area.

* * * * *